United States Patent [19]

Pfeiffer

[11] Patent Number: 5,769,572
[45] Date of Patent: Jun. 23, 1998

[54] BAG DUMPING STATION VACUUM

[75] Inventor: John W. Pfeiffer, Hughesville, Pa.

[73] Assignee: Young Industries, Inc., Muncy, Pa.

[21] Appl. No.: 767,787

[22] Filed: Dec. 17, 1996

Related U.S. Application Data

[63] Continuation-in-part of Ser. No. 609,396, Mar. 1, 1996.
[51] Int. Cl.⁶ ................................................ B65G 53/14
[52] U.S. Cl. ........................ 406/153; 406/46; 406/163; 406/171; 406/194
[58] Field of Search ........................ 406/46, 151, 152, 406/153, 154, 163, 168, 171, 172, 175, 194

[56] References Cited

U.S. PATENT DOCUMENTS 4,764,058  8/1988  Jones et al. ..................... 406/153 X

FOREIGN PATENT DOCUMENTS 2272926  12/1975  France ............................... 406/168

Primary Examiner—Andrew C. Pike
Attorney, Agent, or Firm—Lalos & Keegan

[57] ABSTRACT

A bag dumping station for receiving particulate materials from rupturable bags or other portable containers is provided with a vacuum facility with a direct inlet to the hopper of the station and includes an ejector for providing motive gas for vacuum conveying particulate solids from a drum or spilled materials from broken bags.

12 Claims, 2 Drawing Sheets

BAG DUMPING STATION VACUUM

RELATED APPLICATIONS

This application is a continuation-in-part of pending U.S. patent application Ser. No. 08/609,396, filed Mar. 1, 1996.

BACKGROUND OF THE INVENTION

The present invention relates to bulk material handling and more particularly to an apparatus into which particulate or comminuted material contents of a portable bulk container may be charged for further handling, which apparatus is generally referred to as a bag dumping station, and more particularly to an attachment to the bag dumping station for vacuuming spilled material in the vicinity of the station or for vacuum conveying material into the bag dumping hopper from a material container that is too large or damaged to be lifted. The present invention relates more specifically to pneumatic conveying ejectors for introducing a flow of pressurized motive gas that provides energy for vacuum-conveying of the particulate solids into the bag dumping station hopper.

Typically, a bag dumping station receives the particulate material contents of a rupturable bag or other portable bulk container, which contents are charged into the station where they may be further processed, stored, or pneumatically conveyed. The bag dumping station generally includes a hopper having a grate disposed across an opening thereof into which the contents of the bag or bulk container may be charged. Further included is a filtering unit having an inlet communicating with the interior of the hopper and a blower for drawing airborne particles produced by the charging of such material into the hopper from the vicinity of the work area and conveying them through a filter unit to prevent such particles from escaping into the air and possibly causing environmental problems in the work area.

When rupturable bags are opened for charging their contents into the bag dumping station, a certain amount of spillage will occur during the process, and of course, material will spill from damaged bags in the vicinity of the station. Further, the particulate material may also be transported to the station in bulk containers such as drums that are too large to lift onto the station grate. In these instances it would be desirable to have a facility at the station for conveying spilled or drum-contained material directly into the station hopper.

SUMMARY OF THE INVENTION

The present invention addresses the problem of spilled or drum-contained material by providing a vacuum facility integrally connected with the station so that vacuumed particulate material can be conveyed directly into the station hopper. Such vacuum facility utilizes the improved ejector disclosed in co-pending patent application Ser. No. 08/609, 396. A vacuum hose is connected to a fluids/solids mixing chamber of the ejector. The exhaust opening of the ejector is in the station hopper where a deflector is provided to reduce the velocity of the incoming particulate material and separate it from the conveying air stream. Dust control and filtration is provided by the normal filtering unit provided with the bag dumping station.

DETAILED DESCRIPTION

Figure 1:
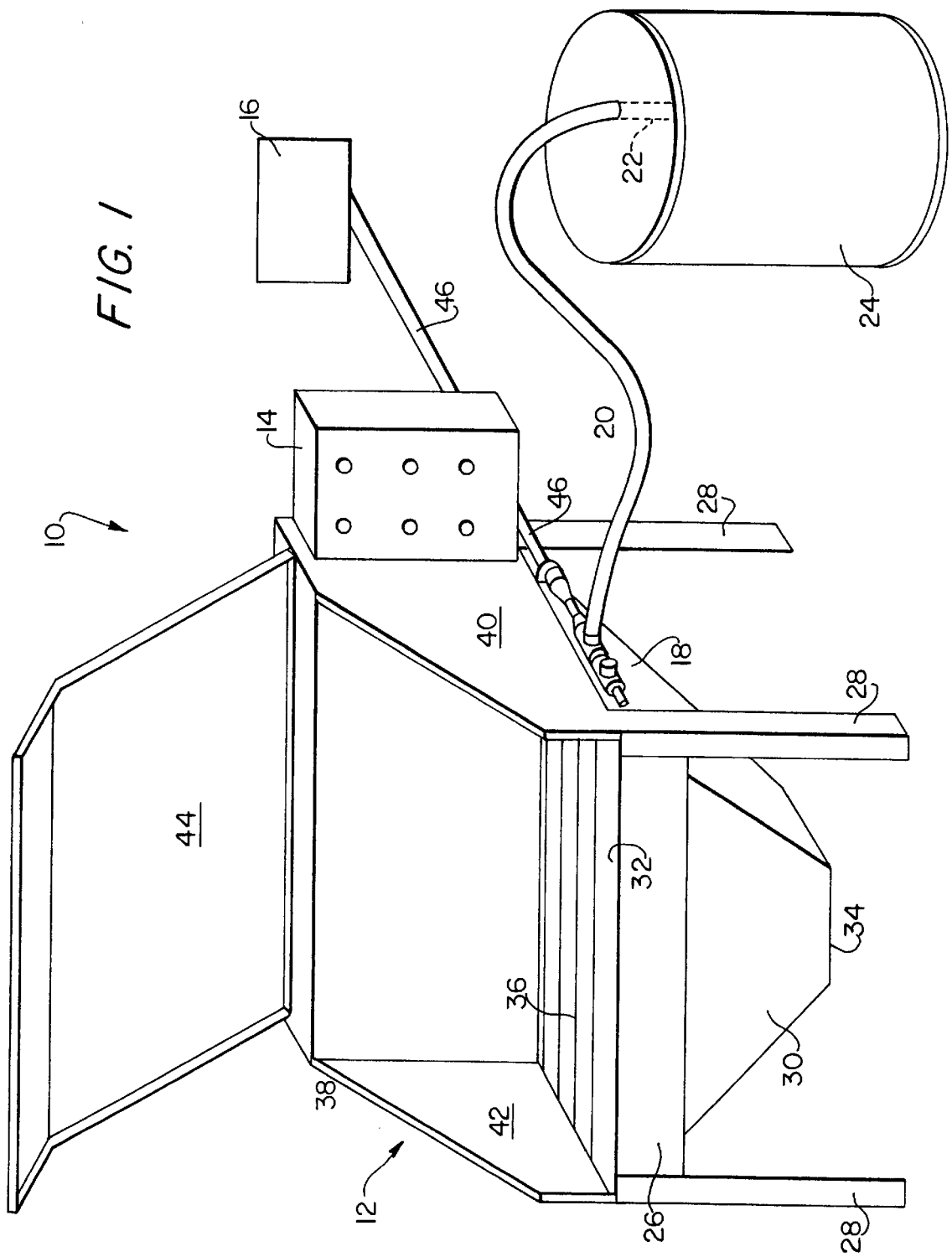
FIG. 1 is a schematic view of the bag dumping station of the present invention.

The bag dumping station vacuum system of the present invention is shown generally at 10 in FIG. 1. It consists generally of a bag dumping housing 12 with a control panel 14, a source of high-pressure compressed gas (e.g., air) 16, a vacuum ejector assembly shown generally at 18, a vacuum hose 20 and vacuum wand 22, and a particulate-material-containing drum 24. Typically, source 16 will be the plant's high-pressure compressed gas source having a gauge pressure in the range of about 80–120 psig.

Bag dumping housing 12 will generally consist of a support frame 26 supported by a set of depending legs 28, and is a hopper 30 having an upper inlet 32 and a lower outlet 34 for discharging the contents of the hopper into other storing or conveying equipment, not shown. Disposed across upper inlet 32 and supported on frame 26 is a removable grate 32 upon which bags filled with particulate material may be placed and ruptured to charge the contents thereof into hopper 30. Mounted on support frame 26 at the back of housing 12 will be a filter unit shown only generally at 38. Also supported on frame 26 are a pair of side walls 40 and 42 and a hinged cover 44 for closing the hopper when not in use or when material is being charged only through the vacuum ejector assembly 18.

Figure 2:
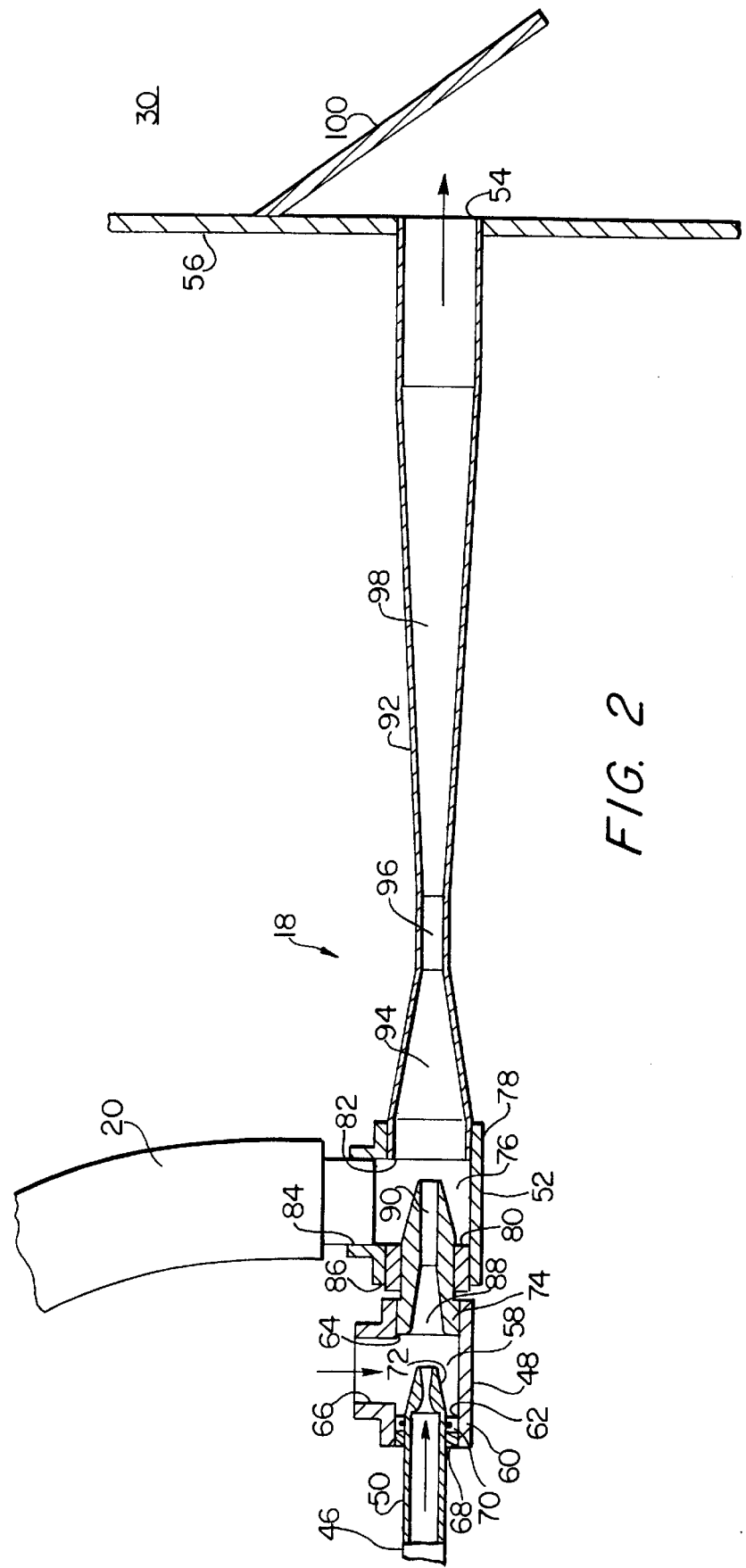
FIG. 2 is a side, partial cross-sectional view of the ejector assembly of the present invention.

The vacuum ejector assembly 18 is connected to high-pressure compressed air source 16 through channel 46 that has connected therein a controllable valve and pressure gauge (not shown) which may be housed with control panel 14. The vacuum ejector assembly 18, shown in greater detail in FIG. 2, includes a gas introduction stage 48, which connects to channel 46 through high-pressure connector 50, and a solids introduction stage 52. Solids introduction stage 52 connects to gas introduction stage 48, to vacuum hose 20, and to hopper 30 through an opening 54 in hopper wall 56.

Gas introduction stage 48 of ejector assembly 18 includes a generally T-shaped fluids mixing chamber 58 formed by a generally cylindrical wall 60 and has a primary inlet port 62, an outlet port 64 collinear with primary inlet port 62, and a transversely located, upper secondary inlet port 66, which is open to the atmosphere or other low-pressure gas supply. Chamber 58 will generally be slightly below atmospheric pressure. High-pressure connector 50 is supported within primary inlet port 62 in a mounting block 68 with a sealing O-ring 70.

Connector 50 connects on one end to high-pressure gas conducting channel 46, which in turn is connected to high-pressure gas source 16, as shown in FIG. 1. Connector 50 terminates on the ejector end in an orifice 72 that is located within chamber 58 and is aligned coaxially with the opening of nozzle 74. Nozzle 74 is mounted within output port 64 of chamber 58 in any suitable manner.

Solids introduction stage 52 of ejector assembly 18 includes a generally T-shaped fluids/solids mixing chamber 76 formed by generally cylindrical wall 78 and has an inlet port 80, an outlet port 82 collinear with inlet port 80, and a transversely located material receiving port 84. Nozzle 74 is supported within inlet port 80 in a mounting block 86. The opening through nozzle 74 includes a convergent cone section 88 located proximately to orifice 72, and a throat 90 that opens into chamber 76.

Diffuser 92 is mounted within outlet port 82 of chamber 76 in any suitable manner. Diffuser 92 is preferably formed as a venturi with a convergent cone section 94 located proximately to throat 90 of nozzle 74, a constricted throat section 96, and a divergent cone section 98. Vacuum hose 20 is mounted within upper port 84 of chamber 76 in any suitable manner.

In operation, high-pressure compressed gas is delivered from source 16 through channel 46 to connector 50. As the compressed gas passes through orifice 72 of connector 50 and into the lower pressure fluids mixing chamber 58 (which is generally below atmospheric pressure), the high velocity gas draws in atmospheric air or low-pressure gas from the upper secondary inlet port 66 as it enters the convergent cone section 88 of the opening in nozzle 74, thereby increasing the mass flow through nozzle 74. This mixture of compressed gas and atmospheric air/low-pressure gas is discharged from throat 90 of nozzle 74 into fluids/solids mixing chamber 76 (which is generally below atmospheric pressure) of solids introduction stage 52. This high velocity gas draws in atmospheric air and particulate solids through vacuum hose 20 and the vacuumed-in air and solids are entrained in the high velocity mixture of compressed gas and atmospheric air/low-pressure gas and the gas/air/suspended solids mixture is moved by positive pressure through diffuser 92 and directly into hopper 30.

The induction of atmospheric air or low-pressure gas in gas introduction stage 48 of ejector assembly 18 prior to entrainment of the particulate solids in solids introduction stage 52 yields an increase in mass flow over that provided by the high pressure gas alone. Thus, sufficient mass flow for solids conveyance can be achieved without increasing the size of orifice 72 (which would increase the amount of compressed gas flowing into chamber 58). Flow rate requirements for vacuuming particulate material are determined empirically or are calculated using conventional and well-known methods. Once the flow rate requirements for a given system are established, the relationship between the size of orifice 72 for admitting compressed gas and the size of upper port 66 for admitting atmospheric air or low-pressure gas can be determined empirically to achieve the necessary flow.

The outlet of the diffuser 92 of ejector assembly 18 is fed into hopper 30 through an opening 54 in wall 56. A deflector 100, shown mounted to wall 56, is provided in the flow path to reduce the velocity of the entering particulate material and to separate it from the conveying air stream. Dust control and filtration are provided by filter unit 38. The end of vacuum hose 20 opposite to the end connected to ejector assembly 18 will have connected thereto a wand 22 (FIG. 1). This wand can take the form of various special-purpose attachments suited to the particular vacuum operation to be performed. For example, the wand may include a special nozzle especially suited for emptying the material-containing drum 24, or be a short hand-held wand for picking up spilled materials from broken bags or may include a long attachment for retrieving material from the general area around the bag dumping station.

From the foregoing detailed description, it will be evident that there are a number of changes, adaptations, and modifications of the present invention which come within the province of those having ordinary skill in the art to which the aforementioned invention pertains. However, it is intended that all such variations not departing from the spirit of the invention be considered as within the scope thereof as limited solely by the appended claims.

I claim:

1. An apparatus for receiving particulate materials disposed in a container comprising:

a hopper having a primary inlet for receiving said particulate materials from said container and a secondary inlet;

an ejector including a gas introduction stage and a solids introduction stage, said gas introduction stage including a fluids mixing chamber having a primary inlet port connectable to a source of high pressure gas, a secondary inlet port communicable with a source of low pressure gas, and an outlet port, and said solids introduction stage including a fluids/solids mixing chamber having a primary inlet port communicating with said outlet port of said gas introduction stage through which a fluid mixture from said fluids mixing chamber is injected into said fluids/solids mixing chamber, a secondary inlet and an outlet port communicating with said secondary inlet of said hopper; and a hose having an end connected to said secondary inlet of said solids introduction stage and an end insertable into said container into proximity to said particulate materials disposed therein, causing said particulate materials to be drawn through said hose, entrained in fluid flowing through said fluids/solids mixing chamber, and the resulting fluids/solids mixture is injected through said outlet port of said solids introduction stage into said hopper.

2. An apparatus according to claim 1, further including a deflector mounted inside of said hopper and disposed across a flow path through said secondary inlet of said hopper to reduce a velocity of said fluids/solids mixture received from said ejector and to separate said particulate materials from said fluids/solids mixture.

3. An apparatus according to claim 1, further including a wand attached to said hose for facilitating vacuuming said particulate materials.

4. An apparatus according to claim 1, wherein said ejector gas introduction stage primary inlet port is generally collinear with said ejector gas introduction stage outlet port.

5. An apparatus according to claim 4 wherein said ejector gas introduction stage secondary inlet port is transverse to said gas introduction stage primary inlet and outlet ports.

6. An apparatus according to claim 1 wherein said ejector solids introduction stage inlet port is generally collinear with said solids introduction stage outlet port.

7. An apparatus according to claim 6, wherein said ejector solids introduction stage secondary inlet is transverse to said solids introduction stage primary inlet and outlet ports.

8. An apparatus according to claim 1 further including a nozzle for connecting said gas introduction stage outlet port to said solids introduction stage inlet port.

9. An apparatus according to claim 1 further including a high-pressure connector for connecting said gas introduction stage outlet port to said solids introduction stage inlet port.

10. An apparatus according to claim 9 wherein said connector includes an orifice on one end which is located within said fluids mixing chamber.

11. An apparatus according to claim 10 further including a nozzle for connecting said gas introduction stage outlet port to said solids introduction stage inlet port.

12. An apparatus according to claim 11 wherein said nozzle includes an opening having a convergent cone section located proximately to said orifice.

* * * * *